United States Patent [19]

Hill

[11] Patent Number: 5,135,959

[45] Date of Patent: Aug. 4, 1992

[54] METHOD OF IMPREGNATING RETICULATED FOAM WITH POLYIMIDE FOAM AND PRODUCTS THEREOF

[75] Inventor: Francis U. Hill, San Diego, Calif.

[73] Assignee: Sorrento Engineering Corporation, National City, Calif.

[21] Appl. No.: 702,952

[22] Filed: May 20, 1991

[51] Int. Cl.$^5$ ............................ C08J 9/38; C08J 9/40

[52] U.S. Cl. .......................... 521/54; 521/52; 521/134; 521/137; 521/139; 521/184; 521/185; 264/51

[58] Field of Search ............... 521/52, 54, 184, 185, 521/137, 139, 134; 264/51

[56] References Cited

U.S. PATENT DOCUMENTS

| | | | |
|---|---|---|---|
| 3,644,168 | 2/1972 | Bonk et al. | 521/51 |
| 3,897,395 | 7/1975 | D'Alelio | 521/157 |
| 4,026,833 | 5/1977 | D'Alelio | 521/157 |
| 4,830,883 | 5/1989 | Lee | 521/54 |
| 4,923,651 | 5/1990 | Hill | 521/54 |
| 4,966,919 | 10/1990 | Williams, Jr. et al. | 521/54 |
| 4,980,004 | 12/1990 | Hill | 521/54 |
| 4,980,102 | 12/1990 | Hill | 521/54 |

Primary Examiner—Morton Foelak
Attorney, Agent, or Firm—Frank D. Gilliam

[57] ABSTRACT

A method of forming complex polyimide foam shapes by impregnating a low density, open cell, reticulated form with polymide foam precursor, placing the combination in a mold, closing the mold, then heating the assembly to the foaming and curing temperatures of the precursor. As the powdered precursor expands, it spreads throughout the reticulated foam producing a product having substantially uniform density and polyimide foam characteristics. If desired, the reticulated foam can be removed from the product by using a material that outgasses and boils away at polyimide processing temperatures. Radar absorbing materials may be incorporated in the reticulated foam so that the final product will have uniformly distributed radar absorbing components with the desirable high temperature resistance and other properties of polyimide foams.

10 Claims, 1 Drawing Sheet

METHOD OF IMPREGNATING RETICULATED FOAM WITH POLYMIDE FOAM AND PRODUCTS THEREOF

BACKGROUND OF THE INVENTION

This invention relates in general to polyimide foam structures and, more specifically, to methods of preparing polyimide foam structures having complex shapes and unique characteristics.

Polyimide resins, as coatings, adhesives, foams and the like have come into widespread use due to their chemical inertness, strength, high temperature resistance and flame resistance. Polyimide foam in the form of sheets and panels are often used as thermal insulation in high temperature environments. Typical polyimide foams include those described in U.S. Pat. Nos. 4,425,441 (Gagliani et al), 4,426,463 (Gagliani et al), 4,518,717 (Long et al), 4,562,112 (Lee et al), 4,621,015 (Long et al) and 4,647,597 (Shulman et al).

Sheets and panels of foam are generally made by causing a layer of liquid or powder precursor on a flat surface to foam without restriction, then slicing the foam at a desired thickness parallel to the surface, to remove the rind that forms on the free surface. This generally produces a foam sheet of optimum uniformity and low density. These sheets may then be adhesively bonded to face sheets to form walls, insulating panels or the like. While useful in many applications, these panels may not have sufficient strength and stiffness for some applications and only very simple structures may be made by this method.

The liquid or powder polyimide foam precursor may also be heated to the foaming and curing temperatures in a closed mold coated with a mold release to form a sheet or other desired shaped foam product as described, for example, by Gagliani et al is U.S. Pat. No. 4,425,441. While a variety of shapes may be formed, the restricted foam expansion often produces foams of uneven density and higher overall density than is generally desired. Problems with closed mold foaming also include variations in cell size, often with large voids, and heavy skins at the tool surfaces. Thus, it is difficult to produce foam products with higher density and strength than those produced by the free foam and trim process.

With complex shapes, it is often impossible to distribute the precursor in powder liquid form in a manner which will produce uniform density in adjacent thin, thick or undercut regions. Also the final structure may not have sufficient strength and stiffness for some purposes where density and strength varies because of the inability to properly distribute the starting materials in a complex mold.

In some cases, as described by Hill in U.S. Pat. No. 4,874,648, a block of uniform density polyimide foam can be reshaped by compressing selected areas to produce a more complex shape. However, the density of the product will vary, with higher density in the compressed region and very complex, undercut, products are very difficult to produce.

For some purposes, it is desirable to distribute other materials throughout a polyimide foam shape in either a uniform or non-uniform distribution. Where the material to be distributed has a higher density, such as metal, ferrite or carbon particles, the material will tend to settle or be otherwise disturbed during foaming, even if evenly distributed in the precursor. Varying the distribution of the additive particles in any specific desired manner is generally not possible with any accuracy.

Thus, there is a continuing need for improved methods of producing complex shapes in polyimide foam materials, especially where uniform density is required or particulate material is to be distributed through the foam in a selected pattern.

SUMMARY OF THE INVENTION

An object of this invention is, therefore, to provide a method of forming complex shapes with foamable polyimide precursor materials. Another object is to provide a method of producing complex polyimide foam shapes having improved density uniformity. A further object is to provide a method of distributing particulate materials through a polyimide foam structure in a selected distribution pattern.

The above objects, and others, are accomplished in accordance with this invention by a method of producing polyimide foam products having complex shapes and compositions which comprises the steps of providing a low density, open cell, reticulated foam body having a desired complex shape, impregnating the reticulated foam shape with a polyimide foam precursor and heating the assembly in a closed mold to the foaming and curing temperature of the polyimide precursor. As the polyimide precursor foams, it fills the interstices of the reticulated foam, producing a polyimide foam product conforming to the mold shape, which is ordinarily the reticulated foam shape.

In some cases, it is desirable to remove the reticulated foam material from the final product. Where the reticulated foam material has a sufficiently low melting and vaporization point, it will evaporate away during the high temperature cure of the polyimide foam.

For a number of ultimate purposes, it is desirable to substantially uniformly distribute a particulate material throughout the polyimide foam product. Merely mixing the particulate material with the polyimide precursor is ordinarily not effective, particularly where the density of the particulate material is high, since the particulate material will tend to settle or otherwise not remain evenly distributed as the foam expands. Those materials can be incorporated into, or coated on, the reticulated foam material. That material will remain in place as the foam expands, assuring the desired distribution. Depending on how the particulate material is applied onto the reticulated foam material, the distribution can be uniform or graded in any desired manner. Typical materials that might be distributed through the polyimide foam include metal, ferrite, carbon and other electrically conductive particles useful in giving the final product selected radar absorption properties.

BRIEF DESCRIPTION OF THE DRAWINGS

Details of the invention and of certain preferred embodiments thereof will be further understood upon reference to the drawings, wherein.

Figure 1:
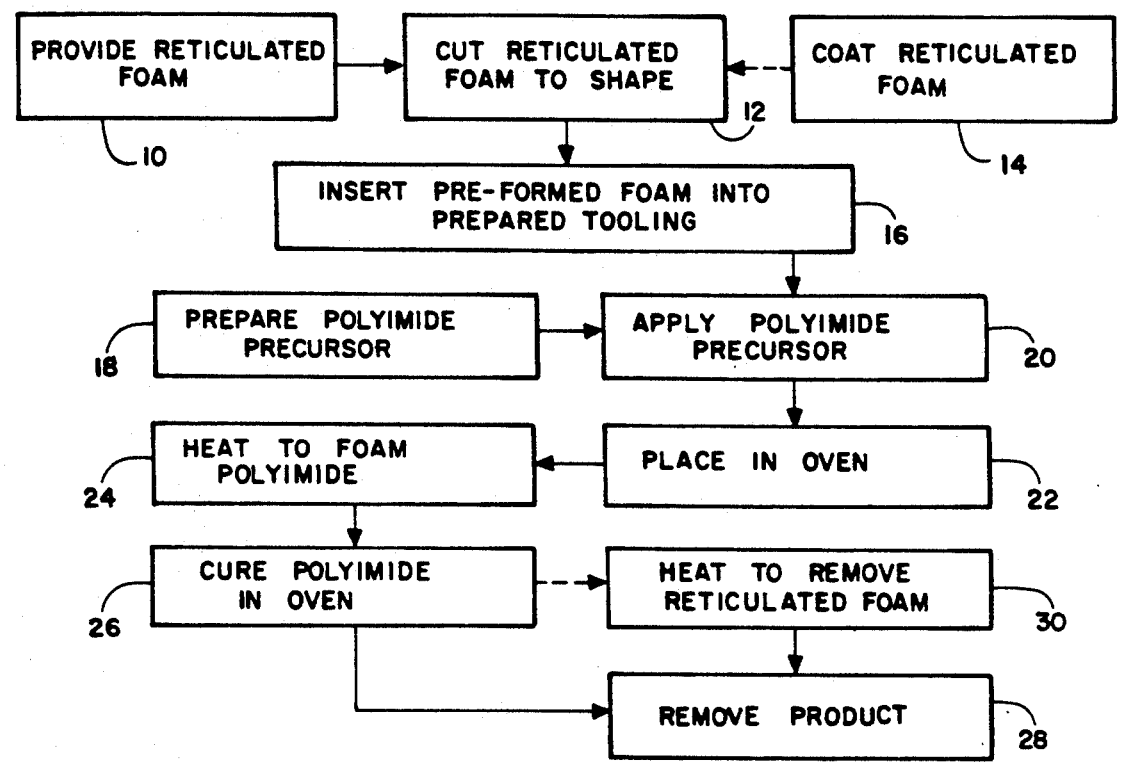
FIG. 1 is a schematic block diagram illustrating the steps in the method of this invention.

Initially, a quantity of reticulated foam is prepared or purchased as indicated in Block 10. Reticulated foam is a net-like foam having very low density and open cells, a skeletal structure having at least about 90% open volume. Typically, the foam may have from about 10 to 100 pores per lineal inch. For best results, I prefer a foam having the maximum open volume and from about 10 to 40 pores per lineal inch. Reticulated foam is commercially available in a number of different compositions. Any suitable reticulated foam having the desired properties may be used. Typical reticulated foams include SIF polyurethane foam from Scotfoam, a subsidiary of GFI or Eddystone, PA, which is available in either ester or ether form and Basotect melamine foam from BASF Aktiengsellschaft, Ludwigshafen, Germany. Reticulated foams are also available formed from polyvinyl chloride, polyethylene and polyimide polymers.

The reticulated foam is then cut to the shape of the final product to be made, as indicated in Block 12. Pieces of foam may also be adhesively bonded together to form the desired shape.

If desired, the reticulated foam may also be coated with any suitable material for any specific purpose as indicated in Block 14. A preferred coating is particulate radar absorbing material in an adhesive carrier. Typical such materials include metal particles, ferrites, carbon particles and the like. Since most polyimides alone are substantially transparent to microwave energy, a number of effective radar absorbing structures and layers may be made by selected distribution of such materials through a polyimide foam.

As indicated in Block 16, the pre-formed reticulated foam is then placed in a mold or other tooling that conforms to the shape of the foam but has a closure or cover which permits free access to the foam in the tooling. The interior surfaces of the tooling are covered with a suitable mold release, such as Teflon fluorocarbon coated glass fiber cloth. Any desired attachment, reinforcement, facing or the like may be placed in the tooling at this time. Those components will be bonded to the product by the foamed polyimide.

Meanwhile, a polyimide foam precursor in liquid or powder form is provided as indicated in Block 18. Any suitable polyimide foam precursor may be used. Typical polyimide foam precursors include those described in the patents described above. We have found that the precursors described by Lavin et al in U.S. Pat. No. 3,554,939 produce excellent results.

Any suitable dianhydride may be used in the preparation of the precursor resin. Best results are generally obtained with 3,3',4,4'-benzophenone tetracarboxylic acid dianhydride (BTDA).

Any suitable diamine may be used. Typical diamines include aromatic diamines such as meta-phenylene diamine, para-phenylene diamine, 4,4'-diaminodiphenyl ether, 4,4'-diaminodiphenyl sulfone, 3,3'-diaminodiphenyl sulfone, 4,4'-diaminodiphenyl sulfide, 4,4'-diamino diaminodiphenyl methane, 3,3'-diaminodiphenyl methane and mixtures thereof. If desired aliphatic diamines may be used in combination with these aromatic diamines. Typical aliphatic diamines include 1,3-diamino propane, 1,4-diamino butane, 1,6-diamino hexane, 1,8-diamino octane, 1,12-diamino dodecane and mixtures thereof. Best results in this process have been obtained with 3,3'4,4'-benzophenone tetracarboxylic acid dianhydride (BTDA) and meta-phenylene diamine (MPDA) using 12% of a dry weight of the ingrediants Dow-Corning DC193 Surfactant.

Where a liquid precursor is used, it can be used as manufactured or thinned somewhat with a suitable solvent for spraying. If a powdered precursor is preferred, the liquid precursor may be dried by any suitable method, such as vacuum drying or air spray drying.

Any suitable additives, such as surfactants fillers, reinforcements, etc., may be added to the reactants as desired.

Typical surfactants include FC430 from 3M, Zonyl FSC from duPont, 190 from Dow Corning and L550 from Union Carbide. Other additives include ultraviolet absorbers, filler such as talc or glass powder, reinforcements such as chopped glass or Aramid fibers, etc. For best results, I find that the use of from about 0.05 to 2 wt % of a surfactant such as Dow Corning DC193 surfactant gives best results and most uniform foam cell size.

The desired quantity of polyimide foam precursor is then applied to the reticulated foam as indicated in Block 20. A liquid precursor may be sprayed onto the foam, with greater quantities applied where the foam has greater thickness or where higher density polyimide foam is desired. Similarly, powdered polyimide foam precursor may be sprinkled into the reticulated foam in a corresponding manner.

The mold is then closed and placed in an oven as indicated in Block 22. Preferably, the mold is not absolutely tightly closed, to allow release of gases, although the mold is preferably sufficiently tight to prevent extrusion of any expanding polyimide foam.

As indicated in Block 24, the mold is then heated to the foaming and condensation temperature of the polyimide foam precursor for a suitable period. The temperature and time will vary depending upon the specific polyimide resin selected. Any suitable heating method may be used. A thermal oven is generally convenient. Microwave heating may also be used, with suitable tooling materials.

Once foaming is complete, the temperature is increased to the curing temperature of the resin selected for a suitable period, as indicated in Block 26. The product then may be removed from the tooling, after suitable cooling, as indicated in Block 28.

If a reticulated foam material was chosen having a vaporization temperature between the curing temperature of the polyimide resin and the temperature at which degradation of the polyimide begins, the tooling may be heated as shown in block 30, while suitably vented, to the vaporization temperature for a period sufficient to permit the elimination of the reticulated foam. Any high temperature resistant particles coated on the reticulated foam, such as metal or carbon particles, will remain distributed through the polyimide foam.

A schematic vertical section view through a reticulated foam layer suitable for impregnation with polyimide foam is shown in FIG. 1. The reticulated foam sheet 36 is placed on support sheet 38, which may me coated with a mold release agent. The size of the open pores 40 and the thickness of the net-like reticulated foam walls 42 are exaggerated for clarity of illustration. As can be seen, there is considerable interconnected open space in pores 40 suitable for impregnation.

Figure 2:
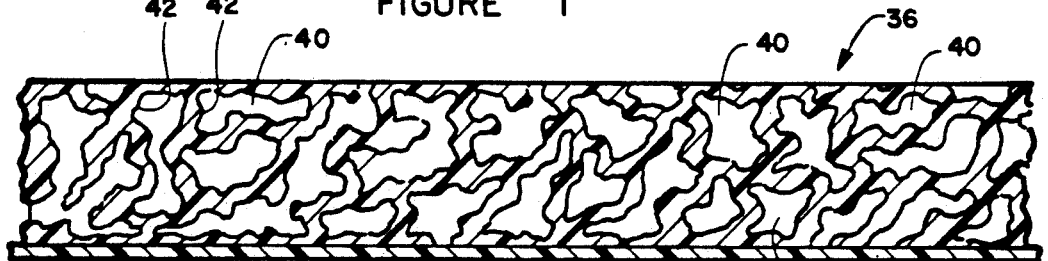
FIG. 2 is a schematic vertical section view through a reticulated foam layer prior to introduction of foamable material.
Figure 3:
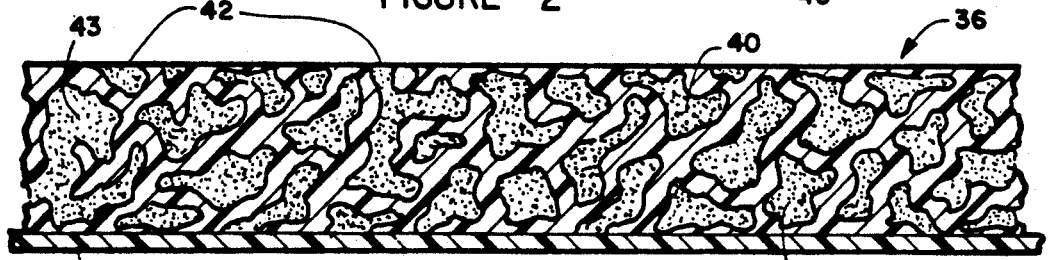
FIG. 3 is a schematic vertical section view through the reticulated foam layer of FIG. 2 after filling with polyimide foam.

FIG. 3 shows the layer of FIG. 2 after the polyimide precursor in dry powder foam or liquid form 43, as described above, has been introduced into pores 40 and heated to the foaming temperature. All pores 40 are substantially filled with the foam. Any foam that extends above the upper surface of reticulated foam sheet 36 may be trimmed away, or a cover sheet similar to support sheet 38 could be placed on the upper surface of sheet 36 to retain all polyimide foam within pores 40, generally resulting in higher density polyimide foam, as discussed above.

Figure 4:
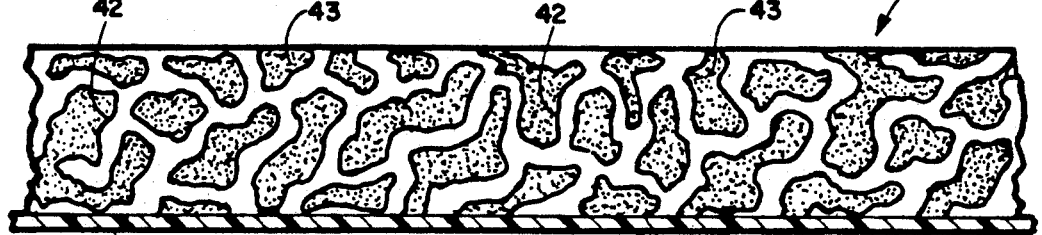
FIG. 4 is a schematic vertical section view through the product of FIG. 3 after removal of the reticulated foam.

As discussed above, a reticulated foam 43 having a relatively low vaporization temperature may be removed by heating the product of FIG. 3 above the vaporization temperature of the reticulated foam material but below the degradation temperature of the polyimide producing a product as shown in FIG. 4. The reticulated foam is removed in the same manner as the well known "lost wax" casting process. The final product then has all of the high temperature resistance, flame resistance, and protection against emission of toxic gases when heated of the polyimide foam. As discussed above, the reticulated foam may contain, or be coated with, additives such as carbon, ferrite or metals to provide microwave energy absorption characteristics to the product, whether or not the reticulated foam itself is removed.

Details of preferred embodiments of the method of this invention will be further understood upon reference to the following Examples. All parts and percentages are by weight unless otherwise indicated.

EXAMPLE I

A portion of SIF reticulated polyurethane foam from Scotfoam Inc having dimensions of 30 cm. by 30 cm. by 19 cm. is prepared. An aluminum mold tool is prepared having a cavity with those dimensions, with a removable cover closing the tool. Teflon fluorocarbon coated glass cloth is cut into pieces having appropriate sizes to precisely line the cavity and cover. A liquid polyimide precursor is prepared by the method described in Example I of Lavin et al U.S. Pat. No. 3,554,939 and spray dried to a fine powder. This precursor is a dispersion of the diethyl ester of benzophenone tetracarboxylic acid and m-phenylene diamine. About 90 grams of the powder is spread uniformly over the reticulated foam in the mold cavity and the cover is closed. The cover is not tightly closed so that gases can escape. The tooling assembly is placed in a thermal oven pre-heated to about 205° C. for about 20 minutes during which foaming occurs. For the final polyimide cure the temperature is then increased to about 235° C. for a period of about 4 hours. The assembly is then removed from the oven and, after cooling to room temperature, the part is removed from the tool. Examination shows that the polyimide foam is distributed uniformly throughout the part and the part is structurally stiff. The surfaces are sealed with a good surface finish. The part has a density of about 0.072 grams per cubic centimeter, is off-white in color and is an excellent thermal insulator, lightweight, flame resistant and is highly transparent to microwaves.

EXAMPLE II

The experiment of Example I is repeated, except that the reticulated SIF foam is not used. Instead, fiberglass filaments are used. These are in the form of chopped random fibers about 1 to 2 inches long, and also with compressed fiberglass rovings in a separate test. In both cases, results are unsatisfactory. The resulting foam is irregular in cell size and density, and collapsed, thereby failing to fill the mold volume satisfactorily. This indicates that the reticulated foam is very helpful in provident a stable structure which supports the polyimide foam in place during the polyimide condensation phase.

EXAMPLE III

The experiment of Example I is repeated, except that after final cure, the assembly is further heated for about 1 hour at about 235° C., about 1 hour at about 260° C., about 1 hour at about 300° C. and about 10 minutes at about 315° C. Then the assembly is cooled to room temperature and the part is removed. Examinations shows it to be somewhat darker in color and lighter in weight, but basically having the same electrical properties. The polyurethane reticulated foam is gone, but a small amount of carbon residue shows the structure. The part now exhibits the characteristics of high temperature polyimides, namely good insulation, flame resistance wide temperature operating range from cryogenic temperatures to about 300° C., and the absence of toxic gas generation when exposed to flames. It is highly transparent to microwaves and has closed cells.

EXAMPLE IV

The experiment of Example I is repeated, except that the reticulated foam is given a pretreatment prior to placement in the mold tooling to create a microwave absorber. Finely divided carbon particles are mixed with a liquid polyester resin and sprayed into the reticulated foam. The resin is allowed to cure and the microwave absorption characteristics of the foam are measured. The sample is then processed as described in Example I. After the part is removed from the mold, the microwave absorption is again measured and found to be essentially unchanged. The part, of course, has vastly improved strength than the original coated reticulated foam.

EXAMPLE V

The experiment of Example IV is repeated, except that after polyimide foam cure the tooling is further heated as described in Example III. The resulting part is found to have its microwave absorption characteristics essentially unchanged by the processing, although the polyurethane reticulated foam and polyester coating have been eliminated.

EXAMPLE VI

The method described in Example I is repeated, except that two parts are made, the first using about 180 grams and the second about 270 grams of polyimide precursor powder instead of the 90 grams used in Example I. The first sample produces a part of increase density and stiffness and the second sample still higher density and stiffness when compared to that produced in Example I.

EXAMPLE VII

The experiment of Example I is repeated, except that a chemically different polyimide precursor powder is used. In this case a polyimide foam precursor is prepared as described in Example VIII of Lavin et al U.S. Pat. No. 3,554,939, then dried in a spray drier to a finely divided powder. Again, a uniform polyimide foam is produced, of a somewhat more yellow color. This sample retains strength up to about 260° C.

EXAMPLE VIII

The process of Example I is repeated, except that Basotect melamine reticulated foam from BASF Corporation is used in place of the SIF foam. Here, the diethyl ester of benzophenone tetracarboxylic acid is mixed with methylene dianiline. The final product is substantially identical to that produced in Example I.

EXAMPLE IX

A viscous polyimide precursor liquid resin is prepared as described in Example I of Lavin et al U.S. Pat. No. 3,554,939. About 1 wt % Dow Corning DC193 surfactant is added to the liquid resin. A sample of SIF reticulated foam from Scotfoam Inc is dipped into this resin and the excess is removed by gently rolling with a soft roller. The Wet reticulated foam is then placed in a thermal oven at a temperature not exceeding 80° C. until all solvent has been removed and the sample is dry. The reticulated foam is then place in conforming tooling and heated as described in Example I. The results are substantially identical to those obtained with the precursor powder in Example I. This technique is particularly suitable for use with complex parts where uniform application of powder is difficult.

EXAMPLE X

The experiment of Example IX is repeated, except that the reticulated foam is placed in the tooling and heated without the pre-drying step. The characteristics of the resulting product are not as satisfactory, since the polyimide precursor reacts chemically with the coated underlying reticulated foam during the heating/curing cycle of the polyimide. The resulting product is darker and friable.

EXAMPLE XI

The experiment of Example I is repeated using a chemically different polyimide precursor powder, namely a powder prepared according to Example I of Hill et al U.S. Pat. No. 4,980,389. The final product is quite similar to that produced in Example I, except that it is white in color and can operate at temperatures above 300° C. for longer periods without degradation.

While certain specific materials, proportions and arrangements were detailed in the above description of preferred embodiments, those may be varied, where suitable, with similar results. For example, The parts formed by this method may be further treated, such as by laminating or joining together of the parts, the additions of facings or the like of metal, plastics, fiber reinforced sheets, etc., or the incorporation of various materials such as reinforcements into the part in the mold prior to foaming of the polyimide.

Other applications, variations and ramifications of this invention will occur to those skilled in the art upon reference to this disclosure. Those are intended to be included within the scope of this invention as defined in the appended claims.

I claim:

1. The method of making complex polyimide foam products which comprises the steps of:
   providing a reticulated foam shape having substantially the dimensions of the intended polyimide foam product;
   impregnating said reticulated foam with a polyimide foam precursor;
   heating said impregnated reticulated foam in a substantially closed mold to the foaming temperature of the polyimide foam precursor;
   further heating the resulting assembly to the curing temperature of said polyimide foam for a time sufficient for substantially complete cure;
   said reticulated foam material having a vaporization temperature below the degradation temperature of the cured polyimide foam; and
   heating said assembly to a temperature above the vaporization temperature of said reticulated foam material but below the degradation temperature of said cured polyimide foam;
   whereby said reticulated foam is substantially eliminated.

2. The method according to claim 1 wherein reticulated foam has the maximum open volume.

3. The method according to claim 1 including the further step of adhesively bonding a plurality of finely divided particles to said reticulated foam prior to impregnation of said reticulated foam with said polyimide foam precursor.

4. The method according to claim 3 wherein said particles are inorganic microwave absorbing particles.

5. The method according to claim 4 wherein said particles are selected from the group consisting of metal, ferrite, carbon and mixtures thereof.

6. The method according to claim 1 wherein said polyimide precursor is impregnated into said reticulated foam by spreading finely powdered dry polyimide precursor particles over the surface of said reticulated foam.

7. The method according to claim 1 wherein said polyimide precursor is impregnated into said reticulated foam by dipping said reticulated foam into a viscous liquid polyimide precursor.

8. The method according to claim 7, further including the step of squeezing out excess liquid polyimide precursor.

9. The method according to claim 8 further including the step of drying said liquid polyimide precursor prior to foaming of the precursor.

10. The method according to claim 1 wherein said mold is closed during foaming only sufficiently to prevent leaking of foam from the mold while permitting exit of gases therefrom.

* * * * *